2 Sheets—Sheet 1.
D. MASTEN.
Combined Square and Level.
No. 228,768. Patented June 15, 1880.
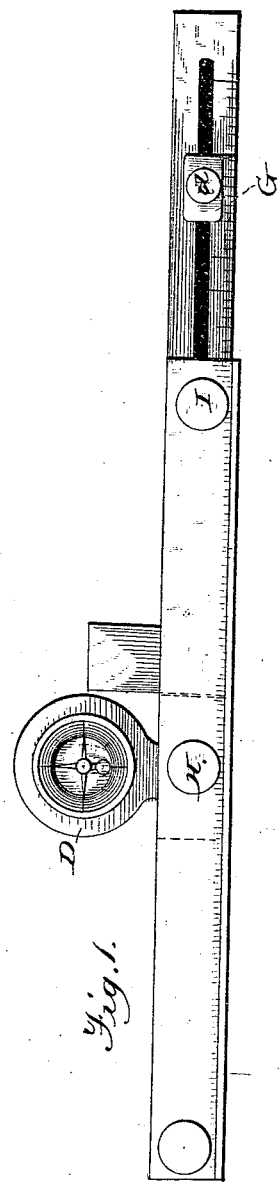
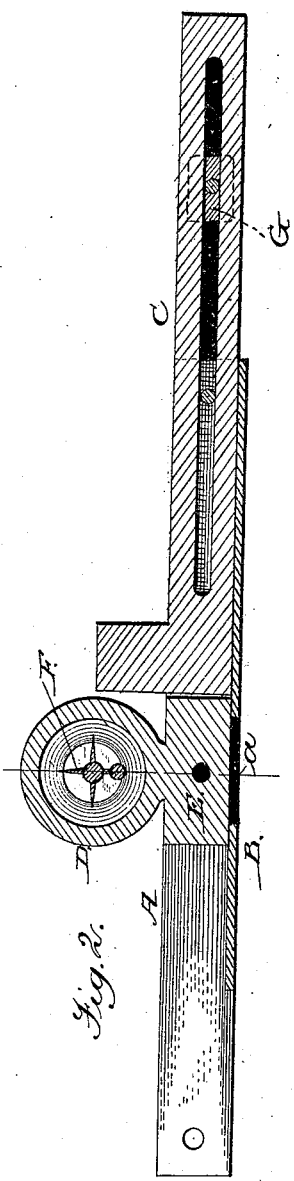
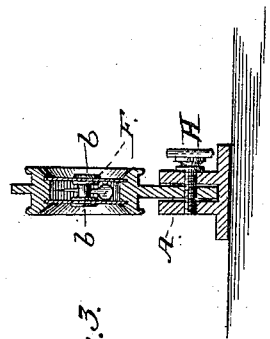
Attest:
J. Walter Fowler,
A. C. Denton
Inventor,
Daniel Masten 2 Sheets—Sheet 2.
D. MASTEN.
Combined Square and Level.
No. 228,768. Patented June 15, 1880.
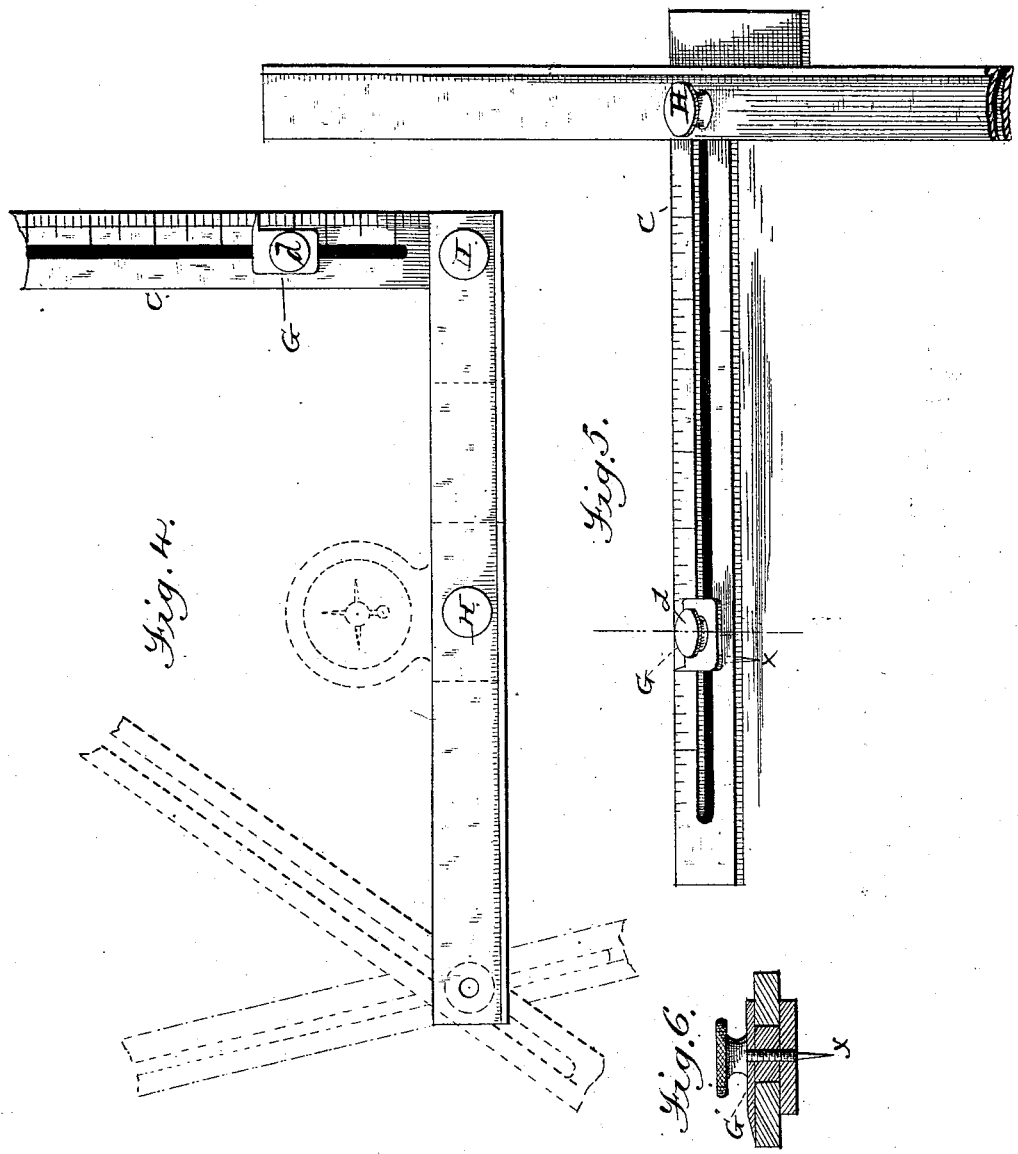
Attest;
J. Walter Fowler,
A. C. Denton
Inventor;
Daniel Masten

UNITED STATES PATENT OFFICE.

DANIEL MASTEN, OF BINGHAMTON, NEW YORK.

COMBINED SQUARE AND LEVEL.

SPECIFICATION forming part of Letters Patent No. 228,768, dated June 15, 1880.

Application filed February 26, 1880.

*To all whom it may concern:*

Be it known that I, DANIEL MASTEN, a citizen of the United States, residing at Binghamton, in the county of Broome and State of New York, have invented certain new and useful Improvements in a Combined Mechanical Tool; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The nature of my invention consists in the construction and arrangement of an indicator or combination-tool for the use of carpenters and others, as will be hereinafter more fully set forth.

In the annexed drawings, Figure 1 is a side elevation of my invention. Fig. 2 is a longitudinal section of the same. Fig. 3 is a central vertical cross-section thereof. Fig. 4 is a side view, showing the bevel. Fig. 5 shows the panel-gage. Fig. 6 is a detailed view.

A A represent two parallel plates or bars fastened, a suitable distance apart, to a base-plate, B. This base-plate extends from one end beyond the center, leaving the other end free, with the slot or space between the two parallel plates.

In the center of the instrument a slot, *a*, is made in the base-plate, of the same width as the distance between the two parallel plates, and of such length as to allow of the square C being passed through the same.

D represents a circular casing, having glass on both sides, and also graduated, and within this casing is hung, on centers *b b*, a four-pronged star-wheel, F, one prong of which is weighted, said wheel thus forming the level or indicator.

The casing D is provided with a plate or foot, E, which fits between the two parallel plates A A.

The long arm of the square C is slotted longitudinally, and graduated, as shown. In the slot is a slide, G, provided with a point, *x*, and fastened by a set-screw, *d*.

The level is fastened by a set-screw, H, and the try-square C is placed in the closed end of the instrument and fastened by a set-screw, I.

The instrument then forms a level or indicator, square, and plumb all in one.

By removing the square C to the open end of the instrument it may be adjusted at any angle desired and fastened by the set-screw I, thus forming a square and bevel.

By removing the level or indicator, and inserting the square through the slot in the base-plate, the slide G being above the plates A, and fastening the same by the set-screw H, a regular panel-gage is formed.

This combination-instrument is simple, cheap, and durable, and there is nothing liable to get out of order.

It will be understood that by the word "indicator" I mean the mechanical device for indicating the angle of elevation in either direction, as the faces of the casing D are graduated so as to show the three hundred and sixty degrees of the circle.

Having thus fully described my invention, what I claim as new, and desire to secure by Letters Patent, is—

1. The combination of the parallel plates A A, base-plate B, casing D, with foot E and level F, substantially as and for the purposes herein set forth.

2. The within-described combination-instrument, consisting of the body A B, slotted square C, with adjustable slide G, and the removable indicator D E F, all constructed substantially as and for the purposes herein set forth.

In testimony whereof I affix my signature in presence of two witnesses.

DANIEL MASTEN.

Witnesses:
J. W. BAIN,
WILLIAM FITCH.